M. M. HASKELL.
LEMON SQUEEZER.
APPLICATION FILED AUG. 17, 1911.

1,046,590.

Patented Dec. 10, 1912.

Witnesses
Cora K. Handy.
Juana M. Fallin.

Inventor
M. M. Haskell

By
Attorneys.

UNITED STATES PATENT OFFICE.

MARGARET M. HASKELL, OF SALEM, MASSACHUSETTS.

LEMON-SQUEEZER.

1,046,590.  Specification of Letters Patent.  Patented Dec. 10, 1912.

Application filed August 17, 1911. Serial No. 644,518.

*To all whom it may concern:*

Be it known that I, MARGARET M. HASKELL, citizen of the United States, residing at Salem, in the county of Essex and State of Massachusetts, have invented certain new and useful Improvements in Lemon-Squeezers, of which the following is a specification.

My invention comprehends certain new and useful improvements in fruit juice extractors, and relates particularly to a device for extracting the juice from oranges, lemons or similar fruits.

My invention aims to provide a juice extractor, strong in its construction, easily cleaned and capable of extracting the juice and small particles of the pulp of the fruit thereby using to the full the flavoring properties.

With these and other objects in view as will more fully appear as the description proceeds the invention consists in certain constructions, arrangements and combinations of the parts that I shall hereinafter fully describe and claim.

Figure 1:
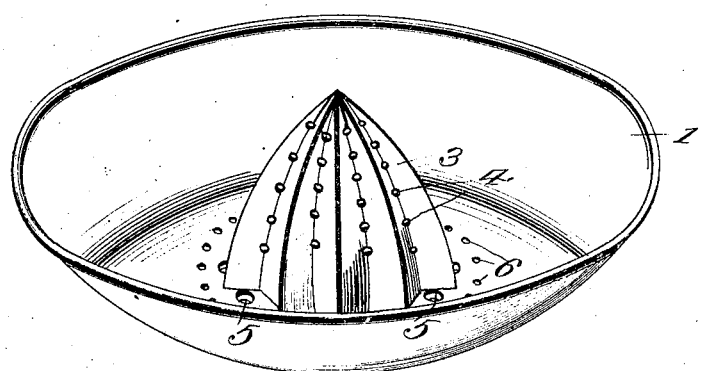
Figure 2:
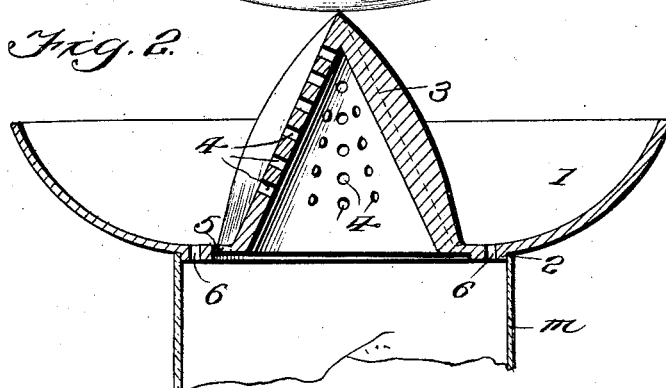
Figure 3:
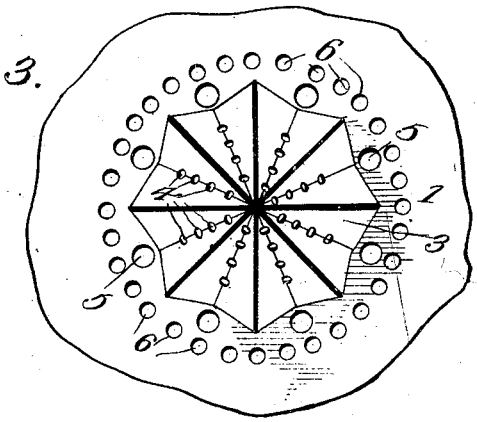

For a full understanding of the invention reference is to be had to the following description and accompanying drawing, in which:

Figure 1 represents a perspective view of my device; Fig. 2 is a vertical transverse sectional view thereof; and Fig. 3 is a plan view of the same.

Corresponding and like parts are referred to in the following description and indicated in all the views of the accompanying drawings by the same reference characters.

Referring to the drawing, the numeral 1 designates the saucer shaped base of my device, the outer curved surface of which is reinforced by a concentric integral bead 2 which also acts as a centering means when the device is placed over a tumbler $m$ or other juice receiving receptacle.

A macerating cone preferably in the form of an integral conical, fluted hollow protuberance 3 is provided within the concaved face of the base 1 and is concentric therewith. Passages 4, small enough to exclude orange or like seeds, are formed in the flutes at the base thereof and perforate the protuberance 3. The somewhat larger passages 5 perforate the base 1 close to its junction with the conical portion 3 and next to the internal apex of the flutes. Other smaller passages 6 annularly arranged perforate the base 1 and pass through the bead 2.

From the foregoing description in connection with the accompanying drawing, the operation of my improved juice extractor will be apparent.

The device is placed on a tumbler or other juice receiver and retained thereon by the bead 2. A halved orange or other similar fruit is rotated about the macerating cone 3, thereby extracting its juice, a part of which passes through the passages 4 to the receiver below and a part finds entrance to the receiver through the smaller perforations 6 in the reinforcing and centering bead 2. Attention is directed to the fact that the saucer shaped base 1 extends outwardly and upwardly the major portion of the height of the macerating cone 3 so that the fruit juice will be prevented from splashing on the clothes of the operator or nearby objects. The larger orifices 5 tend to permit the smaller particles of the pulp to pass down into the receptacle, whereby a partially strained juice is saved, which is an advantage owing to the fact that these particles are nutritious and juicy. It is of course to be understood that the orifices 5 are not large enough to permit the passage of seeds therethrough. It will here be noted that the openings 5 are arranged at the junction of the base and the macerating cone and the smaller openings 6 passing through the reinforcing body are outside of the openings 5 and concentric with the base so that when the fruit is rotated on the cone and the juice is thereby given a tendency to fly out by centrifugal force toward the rim of the device, said openings 6 allow the passage of the juice to the receptacle $m$ even if the larger openings 5 are obstructed by pulp or the like. This provision insures the uninterrupted passage of the juice to the receptacle below so that during the juice extracting operation if the device is accidentally upset none of the liquid will be wasted, as would inevitably be the case if a portion of the juice were retained within the device because of insufficient passageways to the retainer $m$.

Having thus described the invention what is claimed as new is:

A device of the class described comprising a saucer-shaped base, and a macerating cone integral with the base and substantially conical in form and having flutes extending from its base to its apex, the cone being hollow and being formed in the valleys of the flutes with relatively small perforations, the base being formed with an annular series of relatively small perforations surrounding the base of the cone and spaced therefrom, the said base being further formed with relatively large openings located at the bases of the valleys of the flutes and between the walls thereof.

In testimony whereof, I affix my signature in presence of two witnesses.

MARGARET M. HASKELL. [L. S.]

Witnesses:
  MARY W. REEVES,
  ALFRED A. LANG.